United States Patent Office 3,172,883
Patented Mar. 9, 1965

3,172,883
PIGMENT COMPOSITIONS OF THE BENZIDINE YELLOW TYPE
Charles G. Inman, Fort Edward, N.Y., assignor to Hercules Powder Company, Wilmington, Del., a corporation of Delaware
No Drawing. Filed July 2, 1962, Ser. No. 207,019
16 Claims. (Cl. 260—176)

This invention relates to a new class of water-insoluble dyestuffs of the Benzidine Yellow type which are especially useful as pigments in printing inks where high resistance to bleeding in hot dairy wax and similar media is required.

Essentially all commercially important azo yellow pigments belong either to the so-called Benzidine Yellow class, members of which are prepared by tetrazotizing 3,3'-dichlorobenzidine or a similar benzidine and coupling with a monoacetoacetarylide, or to the so-called Hansa Yellow class, members of which are prepared by diazotizing aniline derivatives and coupling with an acetoacetarylide. Each class has certain desirable attributes. The Benzidine Yellows, for example, generally have high strength, low vapor pressure, and low solubility in organic liquids, whereas the Hansa Yellows, although usually inferior to the Benzidine Yellows in these qualities, generally have the advantage of superior lightfastness. These same differences in properties also apply generally to Benzidine Oranges as compared to the so-called Hansa Oranges.

All the commercially available Benzidine Yellow and Benzidine Orange pigments are prepared by coupling one mole of the tetrazotized benzidine with two moles of a relatively low molecular weight monoacetoacetarylide or pyrazolone, and although they are somewhat better than Hansa Yellows and Hansa Oranges in resistance to bleeding in hot dairy wax, they still have an undesirably high solubility in this medium. This solubility is particularly objectionable in cases where milk cartons on which printing has been done with inks containing Benzidine pigments are coated by dipping into baths of molten dairy wax. The solubility of the Benzidine pigments is sufficient to cause discoloration of the bath wax with the result that the wax must be changed after a certain period of use. The wax solubility of Benzidine pigments is also troublesome when these pigments are used for printing on food wrappers which are subsequently waxed and heat sealed.

The principal object of this invention is to provide from readily available intermediates new Benzidine Yellows ranging in hue from that of the coupling of tetrazotized 3,3'-dichlorobenzidine with acetoacet-o-toluidide to much redder shades and which have tinctorial strengths generally comparable to commercially important Benzidine Yellows but with greatly improved resistance to bleed in hot dairy wax.

In accordance with the present invention, the above and other objects are accomplished by the provision of a novel class of Benzidine Yellow pigments prepared by coupling a tetrazotized 3,3'-di- or 2,2',5,5'-tetrasubstituted benzidine with a biacetoacetarylide in the ratio of one mole of the benzidine to two moles of the arylide. The novel pigments of the invention have the following chemical formula:

where R, $R^1$, $R^2$, $R^3$ and $R^4$ are selected from the group consisting of hydrogen, chlorine, methyl and methoxy, and not more than two of the R, $R^1$ and $R^2$ substituents on each aryl nucleus are hydrogen.

The following examples will illustrate the preparation of these pigments and their resistance to bleeding in hot dairy wax. The parts given are parts by weight.

Example 1

6.25 parts of 3,3'-dichlorobenzidine were tetrazotized in dilute hydrochloric acid in known manner with 3.75 parts sodium nitrite. The major portion of the excess nitrite was removed by adding 0.67 part sodium chlorate dissolved in 3.3 parts water. The tetrazo solution was then treated with activated charcoal and a filter aid, filtered, and the remaining nitrite removed by adding small quantities of sulfamic acid.

20.1 parts of 4,4'-bi-o-acetoacetotoluidide were dissolved in 150 parts water, containing 5.0 parts sodium hydroxide, at 50° C.

To the container in which the coupling is to be carried out were added 1250 parts water at 30° C. and 15 parts anhydrous sodium acetate. 10 parts of 70% acetic acid followed by 2.4 parts lauryl pyradinium chloride dissolved in 50 parts water were then added.

Ten percent of the 4,4'-bi-o-acetoacetotoluidide solution was added to the solution in the coupling container. The remaining acetoacetarylide solution and the tetrazotized 3,3'-dichlorobenzidine solution were then added to the coupling container simultaneously over one hour. The resulting color slurry was stirred at 30° C. until coupling was complete, as indicated by a negative reaction of a sample of the color slurry with H-acid (1-amino-8-naphthol-3,6-disulfonic acid).

The color slurry was then heated to the boil at the rate of one C. degree per minute and maintained at the boil for 15 minutes. The color slurry was filtered, washed thoroughly with water, and dried at 180° F.

Example 2

7.80 parts of 2,2'-dichloro-5,5'-dimethoxybenzidine were tetrazotized, filtered, and the excess nitrite removed by the same procedure employed in Example 1.

20.1 parts of 4,4'-bi-o-acetoacetotoluidide were dissolved in 150 parts water at 50° C. containing 5.0 parts sodium hydroxide.

To the container in which the coupling is to be carried out were added 1250 parts water at 30° C. and 15 parts anhydrous sodium acetate. 10 parts of 70% acetic acid followed by 2.4 parts lauryl pyridinium chloride dissolved in 50 parts water were then added.

Eleven percent of the 4,4'-bi-o-acetoacetotoluidide solution was added to the solution in the coupling container. The remaining acetoacetarylide solution and the tetrazotized 2,2'-dichloro-5,5'-dimethoxybenzidine solution were then added to the coupling container simultaneously over one hour. The resulting color slurry was stirred at 30° C. until coupling was complete, as indicated by a negative reaction of a sample of the slurry with H-acid.

The color slurry was then heated to the boil at the rate of one C. degree per minute and maintained at the boil for 15 minutes. The color slurry was filtered, washed thoroughly with water, and dried at 180° F.

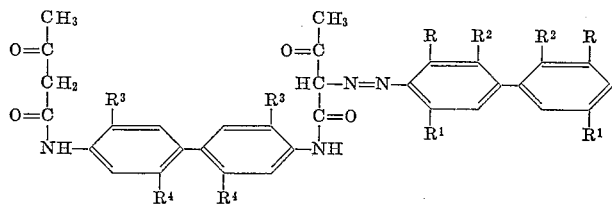
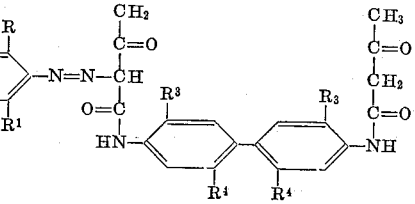

Example 3

6.0 parts of 3,3'-dianisidine were tetrazotized in dilute hydrochloric acid in known manner with 3.75 parts sodium nitrate. The tetrazo solution was treated with a filter aid, filtered, and the excess nitrite removed by adding small quantities of sulfamic acid.

20.1 parts of 4,4'-bi-o-acetoacetotoluidide were dissolved in 150 parts water at 50° C. containing 5.0 parts sodium hydroxide. The acetoacetarylide solution was diluted with water to 1500 parts at 30° C. and 15 parts anhydrous sodium acetate added. The solution was then adjusted to pH 8.3 with acetic acid and 3.6 parts lauryl pyridinium chloride dissolved in 50 parts water were added.

The coupling was carried out by adding the tetrazo solution over one hour to the suspension of the acetoacetarylide under agitation, followed by stirring at 30° C., until a sample of the color slurry gave no reaction with H-acid. The color slurry was then heated to the boil at the rate of one C. degree per minute and maintained at the boil for one hour, after which the color slurry was filtered, washed thoroughly with water, and dried at 180° F.

Example 4

5.26 parts of o-tolidine were terazotized in dilute hydrochloric acid in known manner with 3.68 parts sodium nitrite. The tetrazo solution was treated with activated charcoal and a filter aid, filtered, and the excess nitrite removed by adding small quantities of sulfamic acid.

20.1 parts of 4,4'-bi-o-acetoacetotoluidide were dissolved in 150 parts water at 50° C. containing 5.0 parts sodium hydroxide.

To the container in which the coupling is to be carried out were added 1250 parts water at 30° C. and 15 parts anhydrous sodium acetate. 10 parts of 70% acetic acid followed by 3.6 parts lauryl pyridinium chloride dissolved in 50 parts water were added.

Ten percent of the 4,4'-bi-o-acetoacetotoluidide solution was added to the solution in the coupling container. The remaining acetoacetarylide solution and the tetrazotized o-toluidine solution were then added to the coupling container simultaneously over one hour. The resulting color slurry was stirred at 30° C. until coupling was complete, as indicated by a negative reaction of a sample of the slurry with H-acid.

The color slurry was then heated to the boil at the rate of one C. degree per minute and maintained at the boil for 15 minutes. The color slurry was filtered, washed thoroughly with water, and dried at 180° F.

Example 5

Pigments involving couplings of other biacetoacetarylides with tetrazotized 3,3'-dichlorobenzidine were prepared by the following procedure, where the biacetoacetarylides used were 4,4'-bi-o-acetoacetochloranilide (22.5 parts), 4,4'-bi-o-acetoacetoanisidide (22.2 parts) or 4,4'-biacetoaceto-3-chloro-6-methoxyanilide (25.5 parts):

6.25 parts 3,3'-dichlorobenzidine were tetrazotized and the excess nitrite removed by the procedure of Example 1.

The biacetoacetarylide was dissolved in 150 parts water, containing 5.1 parts sodium hydroxide, at 60° C.

To the container in which the coupling is to be carried out were added 1250 parts water at 30° C. and 15 parts anhydrous sodium acetate. 10 parts of 70% acetic acid followed by 2.4 parts lauryl pyridinium chloride dissolved in 50 parts water were then added. Next, 1.5 parts sodium hydroxide were added.

The coupling reaction was carried out by the procedure of Example 1, and the subsequent heating, filtering and drying operations were performed as in Example 1.

Example 6

Pigments involving couplings of other biacetoacetarylides with tetrazotized 2,2'-dichloro-5,5'-dimethoxybenzidine were prepared by the following procedure, where the biacetoacetarylides used were 4,4'-bi-o-acetoacetochloranilide (22.5 parts), 4,4'-bi-o-acetoacetoanisidide (22.2 parts) or 4,4'-bi-aceto-aceto-3-chloro-6-methoxyanilide (25.5 parts).

7.80 parts 2,2'-dichloro-5,5'-dimethoxybenzidine were tetrazotized and the excess nitrite removed by the procedure employed in Example 1 for 3,3'-dichlorobenzidine.

The solution of the biacetoacetarylide and the subsequent coupling, heating, filtering and drying operations were carried out as described in Example 5.

Example 7

Pigments involving couplings of other biacetoacetarylides with tetrazotized 3,3'-dianisidine were prepared by the following procedure, where the biacetoacetarylides used were 4,4'-bi-o-acetoacetochloranilide (22.5 parts), 4,4'-bi-o-acetoacetoanisidide (22.2 parts) or 4,4'-bi-acetoaceto-3-chloro-6-methoxyanilide (25.5 parts).

6.00 parts 3,3'-dianisidine were tetrazotized and the excess nitrite removed by the procedure employed in Example 3.

The solution of the biacetoacetarylide and the subsequent coupling, heating, filtering and drying operations were carried out as described in Example 5.

Example 8

Pigments involving couplings of other biacetoacetarylides with tetrazotized o-tolidine were prepared by the following procedure, where the biacetoacetarylides used were 4,4'-bi-o-acetoacetochloranilide (22.5 parts), 4,4'-bi-o-acetoacetoanisidide (22.2 parts) or 4,4'-bi-acetoaceto-3-chloro-6-methoxyanilide (25.5 parts):

5.26 parts o-tolidine were tetrazotized and the excess nitrite removed by the procedure employed in Example 4.

The solution of the biacetoacetarylide and the subsequent coupling, heating, filtering and drying operations were carried out as described in Example 5.

Example 9

The pigments prepared in Examples 1 through 8 inclusive were tested for bleed in hot dairy wax by the following procedure:

2.7 grams of pigment was ground with 22.5 grams of a commercial water flexographic ink vehicle and 2.1 grams of water until the pigment was thoroughly dispersed. The resulting ink was applied with a drawout knife to heavy white paper and the print dried overnight. A 2-inch by 8-inch strip was then cut from the print, coiled, and placed in a two-ounce bottle together with 50 grams of melted dairy wax. The bottle was then placed in an oven at 350° F. for ½ hour and the wax poured off into a clean bottle and examined visually while still melted. Only a very slight discoloration of the wax was seen when this procedure was used to evaluate the pigments of Examples 1 through 8.

When this same testing procedure was applied to the commercially important Benzidine Yellows prepared by coupling tetrazotized 3,3'-dichlorobenzidine with acetoacet-o-toluidide and with acetoacet-o-anisidide, a strong coloration of the wax resulted. The commercially important Benzidine Oranges prepared by coupling tetrazotized 3,3'-dianisidine with acetoacetanilide and tetrazotized 3,3'-dichlorobenzidine with 1-p-tolyl - 3 - methyl-5-pyrazolone were also evaluated by this testing procedure, and again a strong coloration of the wax resulted.

The new pigments of this invention are Benzidine Yellows of a wide range of hues, which are generally comparable in tinctorial strength to commercially available Benzidine Yellows but which possess greatly increased resistance to bleeding in hot dairy wax. Consequently, these new pigments are especially desirable for use in inks for printing on containers which are subsequently wax coated. These pigments are also of value for printing on food wrappers which are to be waxed and heat sealed.

What I claim and desire to protect by Letters Patent is:

1. Compounds having the formula:

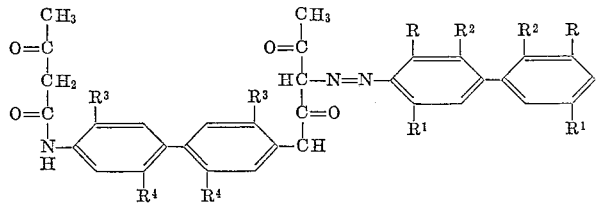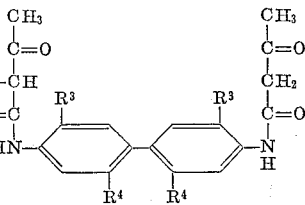

where R, $R^1$, $R^2$, $R^3$ and $R^4$ are selected from the group consisting of hydrogen, methyl, methoxy and chlorine, not more than two of the R, $R^1$ and $R^2$ substituents on each aryl nucleus being hydrogen.

2. A compound as set forth in claim 1 in which $R^1$, $R^2$ and $R^4$ are hydrogen and R and $R^3$ are methyl.

3. A compound as set forth in claim 1 in which $R^1$, $R^2$ and $R^4$ are hydrogen, R is chlorine and $R^3$ is methyl.

4. A compound as set forth in claim 1 in which $R^1$, $R^2$ and $R^4$ are hydrogen, R is methoxy and $R^3$ is methyl.

5. A compound as set forth in claim 1 in which R and $R^4$ are hydrogen, $R^1$ is methoxy, $R^2$ is chlorine and $R^3$ is methyl.

6. A compound as set forth in claim 1 in which R is hydrogen, $R^1$ and $R^3$ are methoxy and $R^2$ and $R^4$ are chlorine.

7. A compound as set forth in claim 1 in which R and $R^4$ are chlorine, $R^1$ and $R^2$ are hydrogen, and $R^3$ is methoxy.

8. A compound as set forth in claim 1 in which R and $R^3$ are methoxy, $R^1$ and $R^2$ are hydrogen and $R^4$ is chlorine.

9. A compound as set forth in claim 1 in which R is methyl, $R^1$ and $R^2$ are hydrogen, $R^3$ is methoxy and $R^4$ is chlorine.

10. A compound as set forth in claim 1 in which R and $R^4$ are hydrogen, $R^1$ is methoxy, and $R^2$ and $R^3$ are chlorine.

11. A compound as set forth in claim 1 in which R and $R^3$ are chlorine, and $R^1$, $R^2$ and $R^4$ are hydrogen.

12. A compound as set forth in claim 1 in which R is methoxy, $R^1$, $R^2$ and $R^4$ are hydrogen and $R^3$ is chlorine.

13. A compound as set forth in claim 1 in which R is methyl, $R^1$, $R^2$ and $R^4$ are hydrogen and $R^3$ is chlorine.

14. A compound as set forth in claim 1 in which R is chlorine, $R^1$, $R^2$ and $R^4$ are hydrogen and $R^3$ is methoxy.

15. A compound as set forth in claim 1 in which R and $R^3$ are methoxy, and $R^1$, $R^2$ and $R^4$ are hydrogen.

16. A compound as set forth in claim 1 in which R is methyl, $R^1$, $R^2$ and $R^4$ are hydrogen and $R^3$ is methoxy.

References Cited by the Examiner
UNITED STATES PATENTS

| | | | |
|---|---|---|---|
| 1,505,568 | 8/24 | Laska et al. | 260—176 |
| 1,932,577 | 10/33 | Eichwede et al. | 260—176 |

CHARLES B. PARKER, *Primary Examiner.*

UNITED STATES PATENT OFFICE
CERTIFICATE OF CORRECTION

Patent No. 3,172,883                                March 9, 1965

Charles G. Inman

It is hereby certified that error appears in the above numbered patent requiring correction and that the said Letters Patent should read as corrected below.

Columns 5 and 6, lines 7 to 16, for that portion of the formula reading:

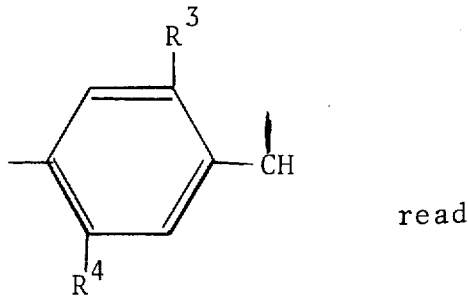 read 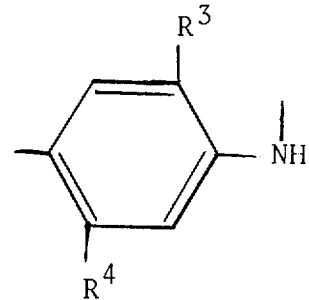

Signed and sealed this 27th day of July 1965.

(SEAL)
Attest:

ERNEST W. SWIDER                                EDWARD J. BRENNER
Attesting Officer                              Commissioner of Patents